(12) United States Patent
Subagio et al.

(10) Patent No.: US 11,424,978 B2
(45) Date of Patent: *Aug. 23, 2022

(54) FAST FORWARDING RE-CONVERGENCE OF SWITCH FABRIC MULTI-DESTINATION PACKETS TRIGGERED BY LINK FAILURES

(71) Applicant: Cisco Technology, Inc., San Jose, CA (US)

(72) Inventors: Putu H. Subagio, Cupertino, CA (US); Ravikanth Nasika, Fremont, CA (US); Saikat Bhattacharya, San Francisco, CA (US); Sundher Narayanaswamy, San Jose, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,062

(22) Filed: Nov. 23, 2020

(65) Prior Publication Data

US 2021/0075666 A1 Mar. 11, 2021

Related U.S. Application Data

(63) Continuation of application No. 16/212,449, filed on Dec. 6, 2018, now Pat. No. 10,848,376.

(51) Int. Cl.
*H04L 41/0668* (2022.01)
*H04L 12/18* (2006.01)
*H04L 12/44* (2006.01)
*H04L 43/0876* (2022.01)
*H04L 43/16* (2022.01)

(52) U.S. Cl.
CPC .......... *H04L 41/0668* (2013.01); *H04L 12/18* (2013.01); *H04L 12/44* (2013.01); *H04L 43/0876* (2013.01); *H04L 43/16* (2013.01)

(58) Field of Classification Search
None
See application file for complete search history.

(56) References Cited

U.S. PATENT DOCUMENTS

| 9,887,874 | B2 | 2/2018 | Vasseur et al. |
| 2007/0133530 | A1 | 6/2007 | Previdi et al. |
| 2013/0336192 | A1 | 12/2013 | Zhao et al. |

(Continued)

OTHER PUBLICATIONS cisco.com, "ACI Fabric Optimizes Modern Data Center Traffic Flows," 26 Pages.

(Continued)

*Primary Examiner* — Christine T Duong
(74) *Attorney, Agent, or Firm* — Patterson + Sheridan, LLP (57) ABSTRACT

A network device receives multi-destination packets from a first node and forwards at least a first of the multi-destination packets to another network device using a first multi-destination tree with respect to the network device. The network device detects that a link associated with the first multi-destination tree satisfies one or more criteria and, in response to detecting that the link satisfies the one or more criteria, selects a second multi-destination tree with respect to the network device. The network device forwards at least a second of the multi-destination packets to the other network device using the second multi-destination tree.

20 Claims, 8 Drawing Sheets

(56) References Cited

U.S. PATENT DOCUMENTS

| | | | |
|---|---|---|---|
| 2015/0085706 A1* | 3/2015 | Ginsberg | H04L 45/48 370/256 |
| 2016/0330076 A1 | 11/2016 | Tiwari et al. | |
| 2016/0359729 A1* | 12/2016 | Banavalikar | H04L 45/16 |
| 2016/0359886 A1 | 12/2016 | Yadav et al. | |
| 2017/0063564 A1 | 3/2017 | Kumar et al. | |
| 2017/0331643 A1 | 11/2017 | Zou | |

OTHER PUBLICATIONS cisco.com, "Cisco ACI Remote Leaf Architecture," 43 Pages.
International Preliminary Report on Patentability for Application No. PCT/US2019/064734 dated Jun. 8, 2021.

* cited by examiner

FAST FORWARDING RE-CONVERGENCE OF SWITCH FABRIC MULTI-DESTINATION PACKETS TRIGGERED BY LINK FAILURES

CROSS-REFERENCE TO RELATED APPLICATIONS

This application is a continuation of co-pending U.S. patent application Ser. No. 16/212,449, filed Dec. 6, 2018. The aforementioned related patent application is herein incorporated by reference in its entirety.

TECHNICAL FIELD

Embodiments presented in this disclosure generally relate to communication networks and, more specifically, to techniques for switching forwarding of multi-destination traffic in response to detecting one or more conditions associated with a link (e.g., link failures).

BACKGROUND

Data center fabrics can be deployed with a local-site controller managing a set of switches using various types of architectures. One example data center design called the network-based spine-and-leaf architecture was developed to overcome several limitations of older network architectures. This architecture has been proven to deliver high-bandwidth, low-latency, and non-blocking server-to-server connectivity. In this architecture, every lower-tier switch (leaf layer) is connected to each of the top-tier switches (spine layer) in a full-mesh topology. The leaf layer consists of access switches that connect to devices such as servers. The spine layer is the backbone of the network and is responsible for interconnecting all leaf switches.

Spine-leaf architectures generally support unicast and multi-destination traffic between a source and one or more destinations. Unicast traffic refers to network traffic that is routed from one source to one destination. Multi-destination traffic refers to traffic that is routed to two or more destinations, and generally constitutes a substantial amount of the traffic in today's data center fabrics. For example, multi-destination traffic can include broadcast traffic (e.g., traffic sent to all devices on a network), multicast traffic (e.g., traffic sent to multiple, selected addresses on a network), and unknown unicast traffic (e.g., unicast traffic sent with unknown destination addresses).

Data center fabrics can also be susceptible to link failures, which can occur periodically, intermittently, or permanently in switches, and cause temporary disruptions to multi-destination traffic in the fabric. Given that multi-destination traffic constitutes a substantial amount the traffic in today's fabrics, such disruptions can significantly impact the network performance between switches in the data center.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method performed by a first network device. The method generally includes receiving a plurality of multi-destination packets from a first node and forwarding at least a first of the plurality of multi-destination packets to a second network device using a first multi-destination tree at the first network device. The method also includes detecting that a link associated with the first multi-destination tree satisfies one or more criteria and, in response to detecting that the link satisfies the one or more criteria, selecting a second multi-destination tree at the first network device. The method further includes forwarding at least a second of the plurality of multi-destination packets to the second network device using the second multi-destination tree.

Another embodiment presented in this disclosure provides a network device. The network device generally includes a processor and a memory containing a program that, when executed by the processor, performs an operation. The operation includes receiving a plurality of multi-destination packets from a first node and forwarding at least a first of the plurality of multi-destination packets to another network device using a first multi-destination tree at the network device. The operation also includes detecting that a link associated with the first multi-destination tree satisfies one or more criteria and, in response to detecting that the link satisfies the one or more criteria, selecting a second multi-destination tree at the network device. The operation further includes forwarding at least a second of the plurality of multi-destination packets to the other network device using the second multi-destination tree.

Another embodiment presented in this disclosure provides a computer-readable medium. The computer-readable medium includes computer program code that, when executed by one or more processors, performs an operation. The operation includes receiving, by a first network device, a plurality of multi-destination packets from a first node and forwarding, by the first network device, at least a first of the plurality of multi-destination packets to a second network device using a first multi-destination tree at the first network device. The operation also includes detecting, by the first network device, that a link associated with the first multi-destination tree satisfies one or more criteria and, in response to detecting that the link satisfies the one or more criteria, selecting, by the first network device, a second multi-destination tree at the first network device. The operation further includes forwarding, by the first network device, at least a second of the plurality of multi-destination packets to the second network device using the second multi-destination tree Example Embodiments Embodiments herein describe techniques for switching forwarding of multi-destination traffic in response to one or more predetermined conditions on link(s) (e.g., link failures). In one embodiment, each switch in a fabric can use a table that maps multi-destination trees to uplink port(s) for multi-destination traffic forwarding decisions at the switch. Upon detecting that a link at the switch satisfies a predetermined condition (or criteria), the switch can switch to a new multi-destination tree with active link(s). The predetermined condition can include, for example, a failure of the link, a quality of the link below or above a threshold, a quality of the link within a bound (or range) or out of bound (or range) of a threshold, a quality of the link within a combination of thresholds based on an arithmetic logic unit (ALU), etc. Doing so can substantially reduce the convergence time within the fabric when a link satisfies certain criteria (e.g., the link has failed), since the switch can achieve localized convergence without waiting for convergence through the control plane. Additionally, by switching multi-destination trees using the techniques presented herein, embodiments can solve deadlock scenarios (e.g., cases where there is a constant threshold and zero rate).

Note that while many of the following embodiments are discussed with reference to a spine-leaf architecture, the techniques discussed herein are not limited to the spine-leaf architecture. The techniques may be extended to any network architecture in which access network devices communicate with each other via multiple core network devices providing redundancy in terms of the path a data flow may take between two access network devices.

Figure 1A:
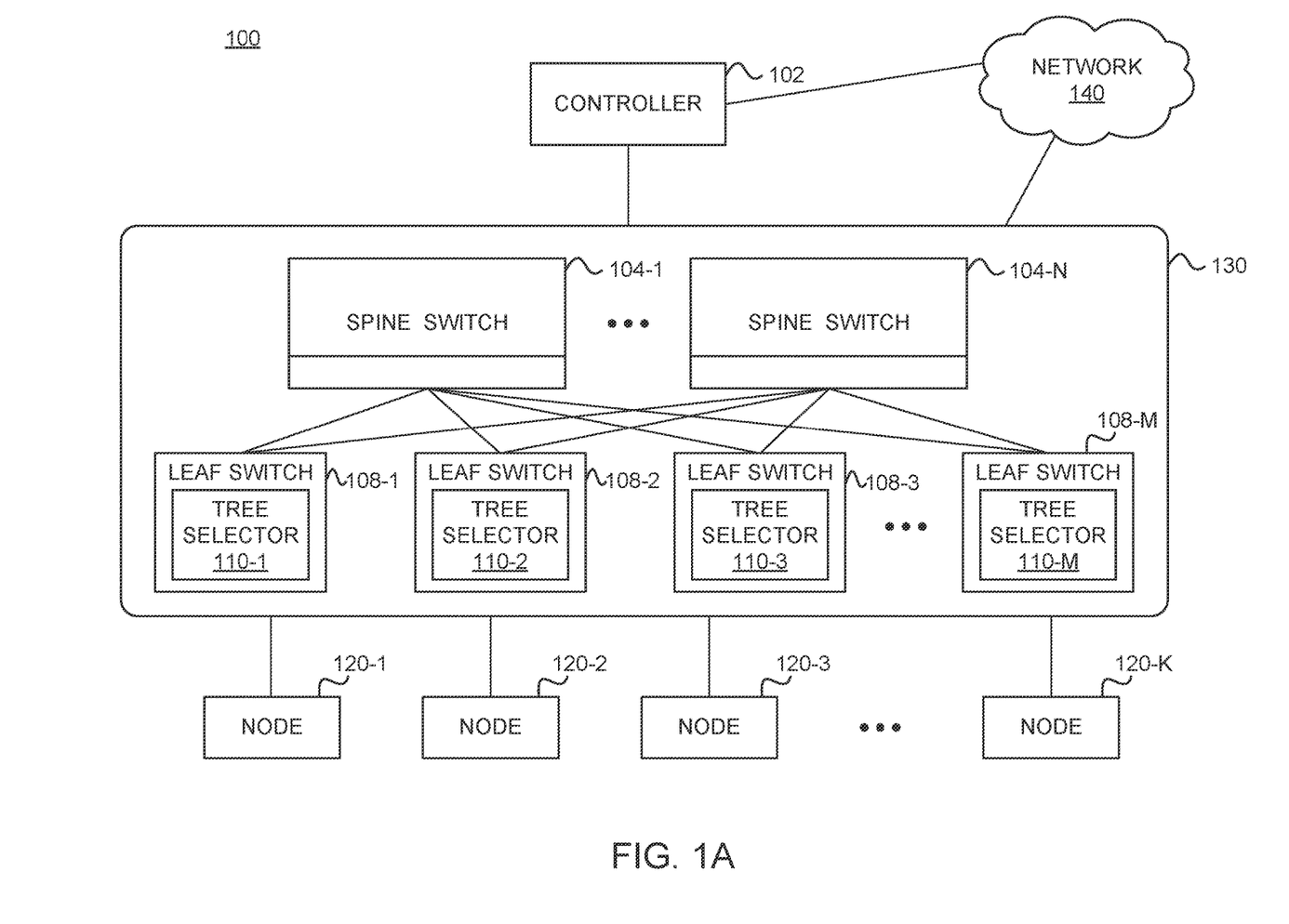
FIG. 1A illustrates an example network architecture for a fabric in which each leaf switch is configured with a tree selector, according to one embodiment described herein.
Figure 1B:
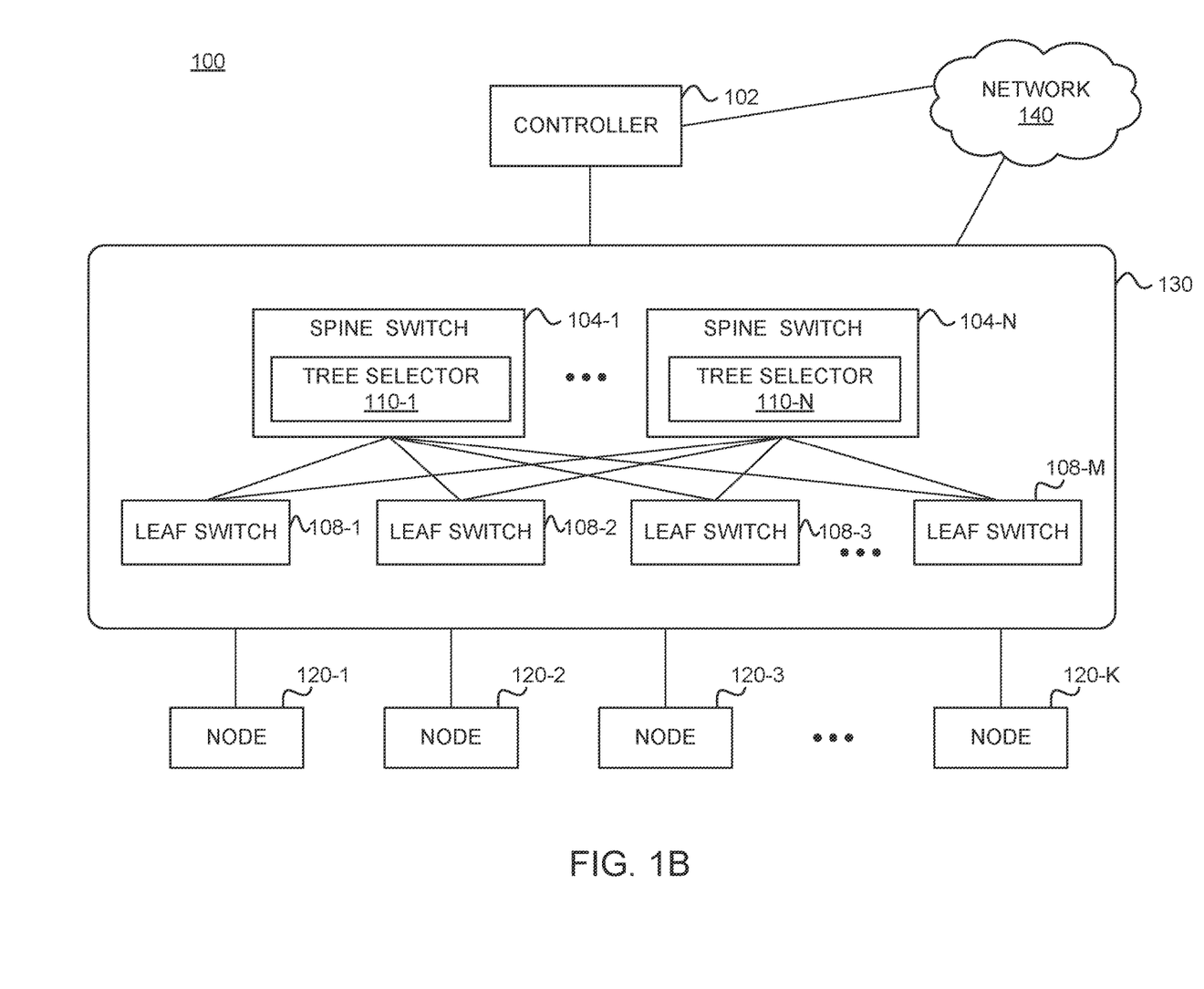
FIG. 1B illustrates an example network architecture for a fabric in which each spine switch is configured with a tree selector, according to one embodiment described herein.

FIGS. 1A and 1B illustrate an example network architecture 100 that includes a leaf-spine fabric 130, according to one embodiment. As shown, the network architecture 100 includes multiple spine switches 104 1-N (also referred to as core network switches) and multiple leaf switches 108 1-M (also referred to as access network switches), where each leaf switch 108 is connected to each spine switch 104. The spine switches 104 1-N together are often referred to as the spine of the leaf-spine fabric 130.

The network architecture 100 also includes nodes 120 1-K coupled to one or more of the leaf switches 108 1-M. Each of the nodes 120 may include a server, a virtual machine, a software application, etc. In some embodiments, each node 120 communicates with another node 120 using the leaf-spine fabric 130 for routing data flows between the nodes. In some embodiments, each node 120 can communicate with another node (e.g., in another site or data center) using the leaf-spine fabric 130 for routing data via network 140 (e.g., the Internet). Generally, the controller 102 is a central entity that manages and configures policies on each of the leaf and spine switches in the leaf-spine fabric 130. In addition to forwarding data plane traffic, the network 140 may forward management or control plane traffic between the controller 102 and the leaf-spine fabric 130.

In some embodiments, the network architecture 100 may be implemented as a Cisco Application Centric Infrastructure (ACI) or Software Defined Network (SDN). The Cisco ACI fabric includes a leaf-spine architecture similar to the leaf-spine fabric 130 shown in FIGS. 1A and 1B. From a management perspective, the central controller 102 (e.g., SDN controller) of the ACI fabric, also referred to as the Application Policy Infrastructure Controller (APIC), manages and configures the policy on each of the switches in the ACI fabric. The APIC acts as a central repository for all policies and has the ability to rapidly deploy and re-deploy hardware, as needed, based on network performance.

The Cisco ACI may also serve as a platform for other services that are performed within the data center or cloud environment. For example, through the use of the central controller 102, third party services may be integrated for advanced security, load balancing, and monitoring. Note that ACI is merely used as an example. The embodiments herein are not limited to such and can be used with any other suitable SDN platform.

As noted, the network architecture 100 may support multi-destination traffic between a source and multiple destinations. As an example, the multi-destination traffic can include tenant multicast traffic, broadcast traffic (e.g., Address Resolution Protocol (ARP)/gratuitous ARP (GARP) traffic), and unknown unicast traffic (e.g., for endpoint learning, forwarding to silent hosts, etc.). Network devices (e.g., spine switches 104, leaf switches 108, etc.) generally use multi-destination trees to determine multi-destination traffic forwarding destinations. In one embodiment, the multi-destination trees can be used to load balance multi-destination traffic within the fabric.

Each multi-destination tree is associated with a unique multi-destination tree tag. The ingress network device (e.g., ingress leaf switch 108 or ingress spine switch 104) assigns a multi-destination tree tag to the multi-destination traffic when forwarding the traffic. As a reference example, assume leaf switch 108-1 is the ingress network device that receives multi-destination traffic. That is, the leaf switch 108-1 may receive a message (e.g., packet(s)) from a node 120 to be transmitted via the fabric 130 to multiple destination nodes 120. In this example, the leaf switch 108-1 may assign a multi-destination tree tag to the message when forwarding it to the spine (e.g., one of spines 104). The spine 104 and/or any intermediate leaf switches 108 that receive the message in turn forward the message along the multi-destination tree associated with the multi-destination tree tag. In one embodiment, the multi-destination tree tag may be assigned to the message as part of the destination multicast address.

Figure 2:
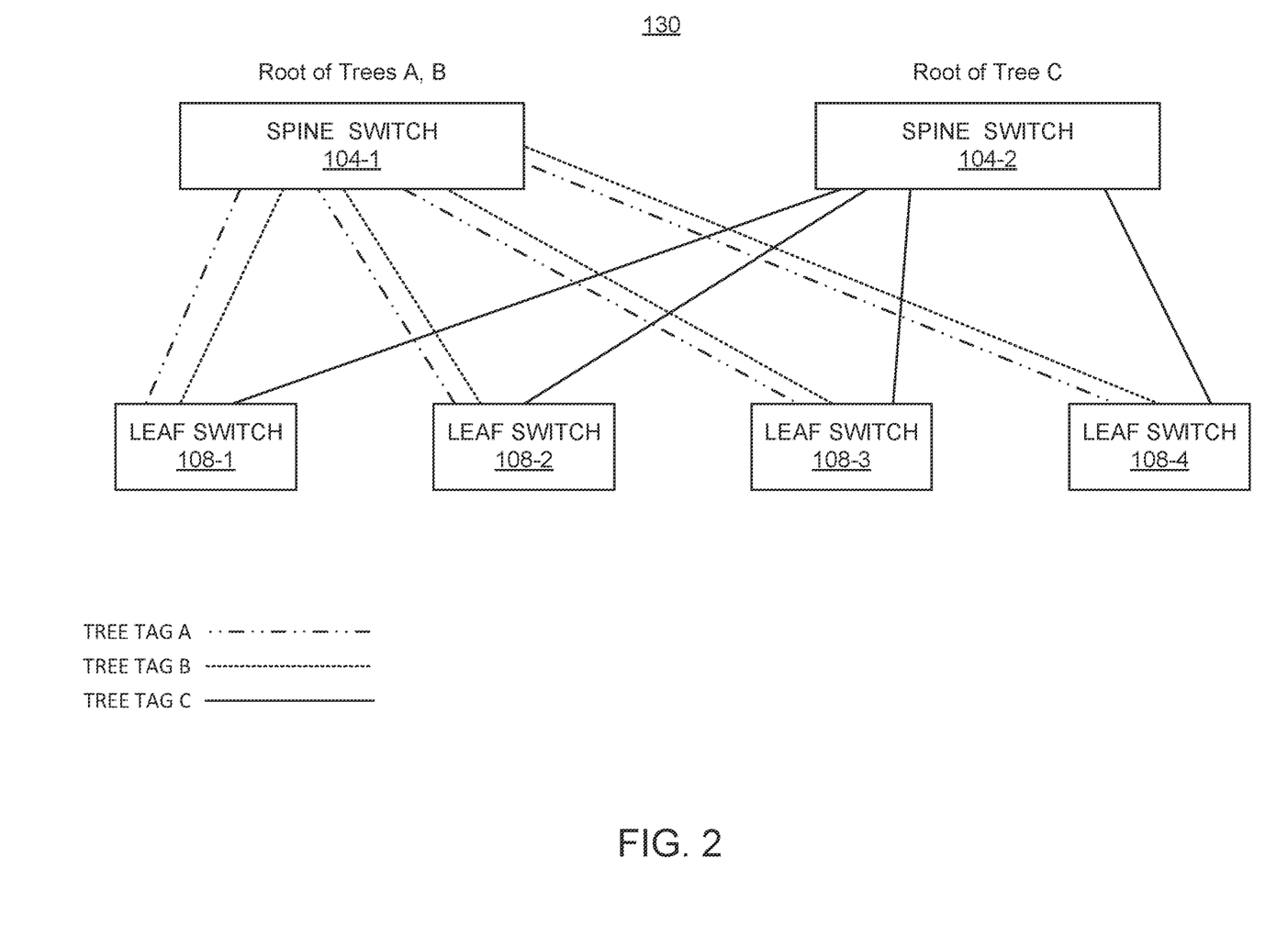
FIG. 2 illustrates an example spine-leaf fabric with multiple multi-destination trees, according to one embodiment described herein.

In embodiments herein, each multi-destination tree may be rooted on one of the spine switches 104. By way of example, FIG. 2 shows a spine-leaf fabric 130 with three multi-destination trees A, B and C. In the depicted example, spine switch 104-1 is the root node for multi-destination trees A and B, and spine switch 104-2 is the root node for multi-destination tree C. Each leaf switch 108-1 to 108-4 can connect to each multi-destination tree A, B, C either directly (e.g., as shown in FIG. 2) or through intermediate network devices.

The controller 102 is generally responsible for placing the roots of the multi-destination trees on the spine switches 104, e.g., as part of the spine-leaf fabric discovery process. As part of the placement, the controller 102 can specify the number of multi-destination trees to be used within the spine-leaf fabric, the roots of the multi-destination trees, multi-destination tree tag identifiers, etc. The controller 102 is generally responsible for re-configuring multi-destination trees in the event of topology changes (e.g., link failures, switch additions, switch removals, etc.). However, when a link (e.g., between a leaf and spine) in the fabric fails (or, in general, satisfies a predetermined condition, such as having a link quality below within a threshold), multi-destination traffic traversing the multi-destination tree for the failed link is black-holed. This results in a loss of packets until the controller 102 achieves convergence via the control plane (e.g., via application and/or software fixes). For example, the controller 102 (e.g., in the control plane) generally is responsible for disabling the multi-destination tree associated with the failed link from the entire spine-leaf fabric. During this down-time (e.g., on the order of several hundred milliseconds), several packets can be dropped, reducing the data center utilization and significantly impacting application performance.

As such, embodiments provide techniques that allow each switch in the fabric to achieve localized convergence after detecting a link failure, without waiting for convergence from the control plane. The techniques presented herein can achieve a convergence time in the range of nanoseconds, as opposed to a convergence time of several hundred milliseconds achieved by the control plane. A sub-nanosecond convergence makes lossless operation possible for protocols, such as fibre channel (FC), fibre channel over ethernet (FCoE), remote direct memory access (RDMA) over converged ethernet (RoCE), etc.

Embodiments configure each network device (e.g., leaf switch 108, spine switch 104) with a tree selector 110 that allows the network device to independently select a different multi-destination tree upon detecting a link failure (or other link condition satisfying a predetermined condition) at the network device. FIG. 1A shows a reference example where each leaf switch 108-1 to 108-M is configured with a respective tree selector 110-1 to 110-M. FIG. 1B shows another reference example where each spine switch 104-1 to 104-N is configured with a respective tree selector 110-1 to 110-N. In general, however, each of the leaf switches and spine switches in a fabric can include a tree selector 110.

Figure 3:
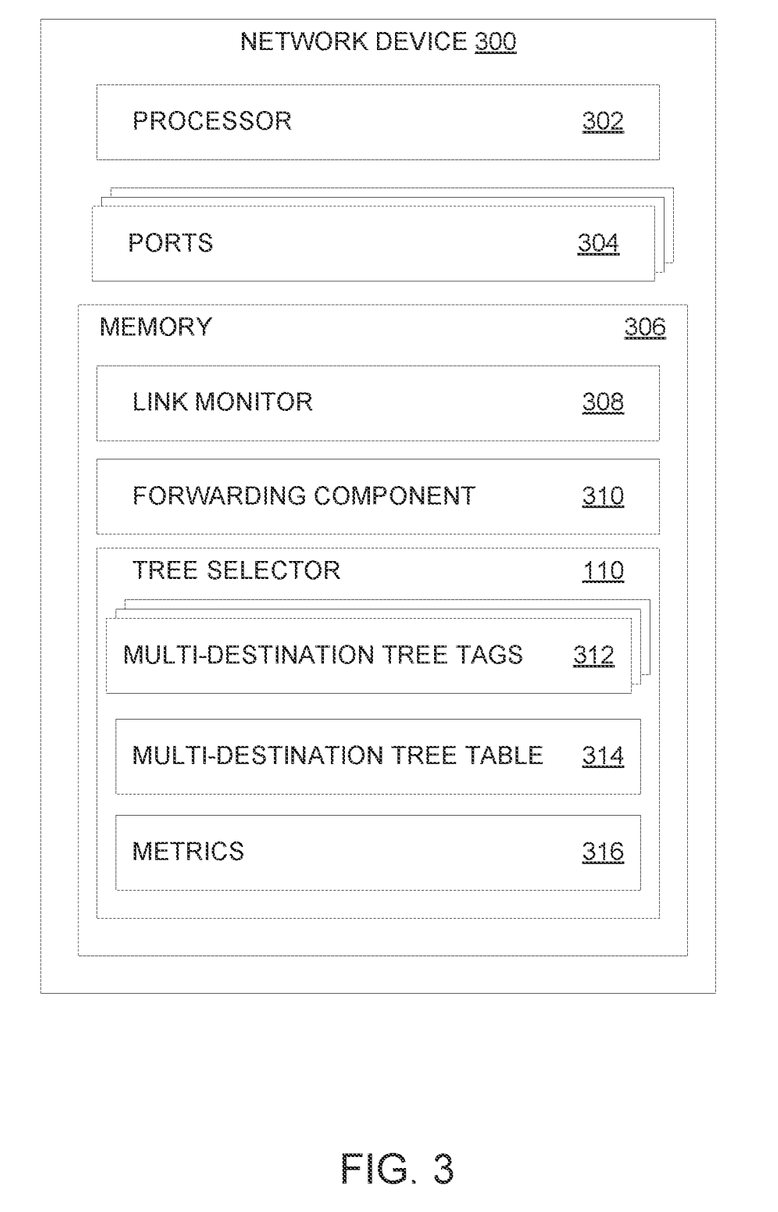
FIG. 3 illustrates an example network device configured with a tree selector, according to one embodiment described herein.

FIG. 3 illustrates an example network device 300 configured with a tree selector 110, according to one embodiment. In one embodiment, the network device 300 is representative of a leaf switch (e.g., leaf switch 108 illustrated in FIGS. 1A and 1B). In one embodiment, the network device 300 is representative of a spine switch (e.g., spine switch 104 illustrated in FIGS. 1A and 1B).

The network device 300 includes a processor 302, communication ports 304, and memory 306. The processor 302 may be any processing element capable of performing the functions described herein. The processor 302 represents a single processor, multiple processors, a processor with multiple cores, and combinations thereof. The communication ports 304 facilitate communication between the network device 300 and other network devices (e.g., spine switch 104, leaf switch 108, etc.) and/or nodes 120. The memory 306 may be either volatile or non-volatile memory and include RAM, flash, cache, disk drives and the like. Although shown as a single entity, the memory 306 may be divided into different memory storage elements such as RAM and one or more hard disk drives.

As shown, the memory 306 includes a link monitor 308, a forwarding component 310, and a tree selector 110. The link monitor 308 is configured to monitor links between the network device 300 and another network device to determine if a link satisfies one or more predetermined conditions (or criteria). For example, the condition(s) (or criteria) can include a number of packet drops exceeding a threshold, a failure of the link (e.g., the link is down), quality of the link is below or above a threshold, quality of the link is within a threshold range or outside of a threshold range, etc. The link monitor 308 can perform signal detection on port(s) 304 of the network device 300 to detect a loss of sync (LOS), packet loss (or drops) (e.g., due to checksum or cyclic redundancy check (CRC) errors, etc.), a broken (or down) link, etc. In some embodiments, if the link monitor 308 determines that quality of the link between the network device 300 and another network device is below a threshold, the link monitor 308 may determine that the link has failed and send an indication of the failure to tree selector 110 (e.g., to trigger selection of another multi-destination tree).

The tree selector 110 is generally configured to switch to new multi-destination trees for forwarding multi-destination traffic after receiving an indication that the link at the network device 300 satisfies a predetermined condition(s). The tree selector 110 includes multi-destination tree tags 312, a multi-destination tree table 314, and metrics 316. The multi-destination tree tags 312 are used to identify the multi-destination trees available at the network device 300. Using FIG. 2 as an example, the multi-destination tree tags 312 at leaf switch 108-1 may include multi-destination tree tags A, B, and C. The multi-destination tree table 314 includes mappings between the multi-destination trees (corresponding to multi-destination tree tags 312) and port(s) 304 at the network device 300. In one embodiment, the network device 300 may receive the multi-destination tree table 314 from the controller 102, e.g., as part of an initial configuration. The tree selector 110 uses the multi-destination tree table 314 to switch to another multi-destination tree after receiving an indication from the link monitor 308 that a link at the network device 300 satisfies a predetermined condition. In some embodiments, the tree selector 110 can use metrics 316 to determine which of the available multi-destination trees to select as the new multi-destination tree. The metrics 316, for example, can include link speed, link utilization, error rates (e.g., crc, runt, etc.), link traffic types (e.g., RoCE, Ethernet, FC, FCoE, etc.), link mediums (e.g., electrical, copper, fiber, air or wireless, etc.), traffic rates, and/or queue occupancy. The forwarding component 310 is configured to transmit multi-destination traffic using the multi-destination tree selected by the tree selector 110.

In some embodiments, a multi-destination tree may include multiple (up)links. By way of example, a multi-destination tree available at a leaf switch (e.g., leaf switch 108-1) may include an uplink towards the root spine switch (e.g., the spine switch where the multi-destination tree is rooted), an uplink towards a transit spine switch (e.g., in the case of a M topology), and/or an uplink towards a special spine switch that connects to another data center (e.g., via an inter-pod (IPN) network). In such cases, the multi-destination tree table 314 at the leaf switch can include the states of all the eligible uplinks for the respective multi-destination tree. If a subset or all of the uplinks fail (or satisfy the predetermined condition(s)), the tree selector 110 can switch to another multi-destination tree (e.g., by switching to a different multi-destination tree tag 312) that has a subset or all of its uplinks in active state. The tree selector 110 may change the status of the multi-destination tree associated with the failed link to "disabled" or "inactive" to prevent the multi-destination tree from being used by the network device 300 until its member link(s) come back up. In some embodiments, if the tree selector 110 is unable to find a suitable multi-destination tree (having a threshold number of active link(s)), the tree selector 110 can fall back to a reserve or default multi-destination tree that has a predefined "important" uplink(s) active. For example, in one embodiment, assuming the network device 300 is a leaf switch 108, the "important" uplink may be predefined for the leaf switch 108 to be the uplink connecting the leaf switch 108 to the spine switch 104 with IPN connectivity.

The tree selector 110 in each network device is independent from the tree selectors 110 in other network devices. That is, tree selector 110-1 in leaf switch 108-1 can switch to a first multi-destination tree based on the multi-destination tree table in leaf switch 108-1, and tree selector 110-2 in leaf switch 108-2 can switch to a second different multi-destination tree based on the multi-destination tree table in leaf switch 108-2. By enabling each network device in the leaf-switch fabric to make independent decisions for forwarding multi-destination traffic, the network devices can significantly reduce the time to achieve convergence within the fabric in the event a link satisfies predetermined condition(s).

Figure 4A:
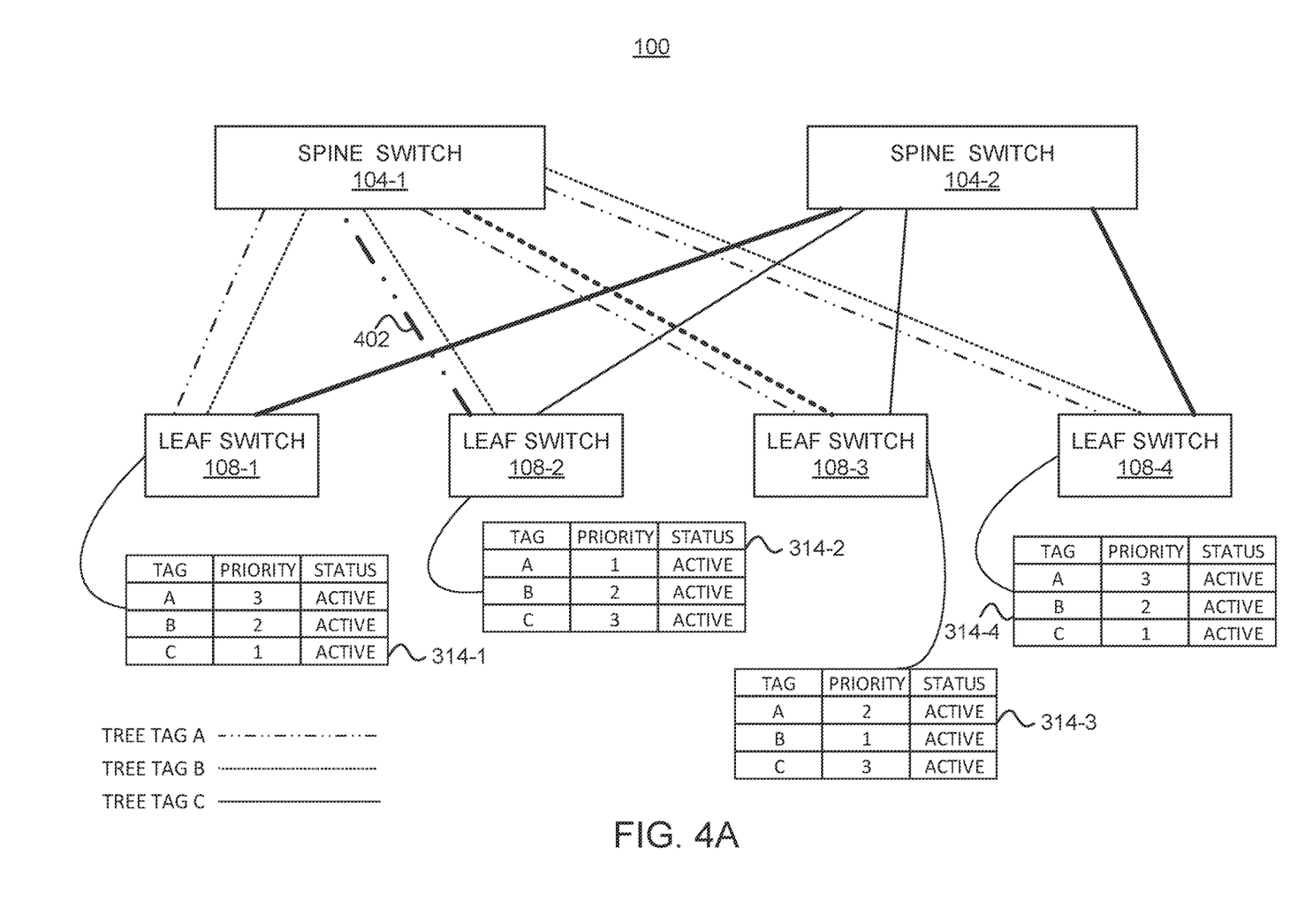
FIGS. 4A-4B illustrate an example scenario of switching a multi-destination tree for forwarding multi-destination traffic, according to one embodiment described herein.

The controller 102 may initially configure the multi-destination tree tables for each network device 300, and send the multi-destination tree tables to the network devices 300. By way of example, FIG. 4A shows a scenario in which leaf switches 108-1 to 108-4 are configured with multi-destination tree tables 314-1 to 314-4, respectively, according to one embodiment. In this example, each multi-destination tree table 314 at a respective leaf switch 108 includes the priority and status of each multi-destination tree at the leaf switch 108. Note that the "priority" and "status" attributes are reference examples of attributes that can be included in the multi-destination tree table, and that the multi-destination tree table can include other attributes, such as tree utilization, bandwidth, etc. As shown in FIG. 4A, leaf switches 108-1 and 108-4 select multi-destination tree C for forwarding multi-destination traffic; leaf switch 108-2 selects multi-destination tree A for forwarding multi-destination traffic; and leaf switch 108-3 selects multi-destination tree B for forwarding multi-destination traffic.

In some embodiments, each network device 300 may actively monitor all links (of the available multi-destination trees) at the network device 300, and modify the multi-destination tree table at the network device 300 based on an evaluation of the link(s) according to one or more metrics 316. By way of example, the leaf switch 108-1 in FIG. 4A has the multi-destination tree C configured as the "first" (e.g., highest) priority tree, multi-destination tree B as the "second" priority tree, and multi-destination tree C as the "third" (e.g., lowest) priority tree. In this example, the leaf switch 108-1 can change the priority of the multi-destination trees A, B, and C based on metrics 316, such as link speed, link utilization, etc. Assuming, for example, that the leaf switch 108-1 determines that the link associated with multi-destination tree A has a higher link speed compared to the link associated with multi-destination tree B, the leaf switch 108-1 can change the priority of the multi-destination tree A to "second," and the priority of the multi-destination tree B to "third." In general, however, the leaf switch 108-1 can change the priority of any of the multi-destination trees upon determining that one or more conditions (based on metrics 316) are satisfied.

Figure 4B:
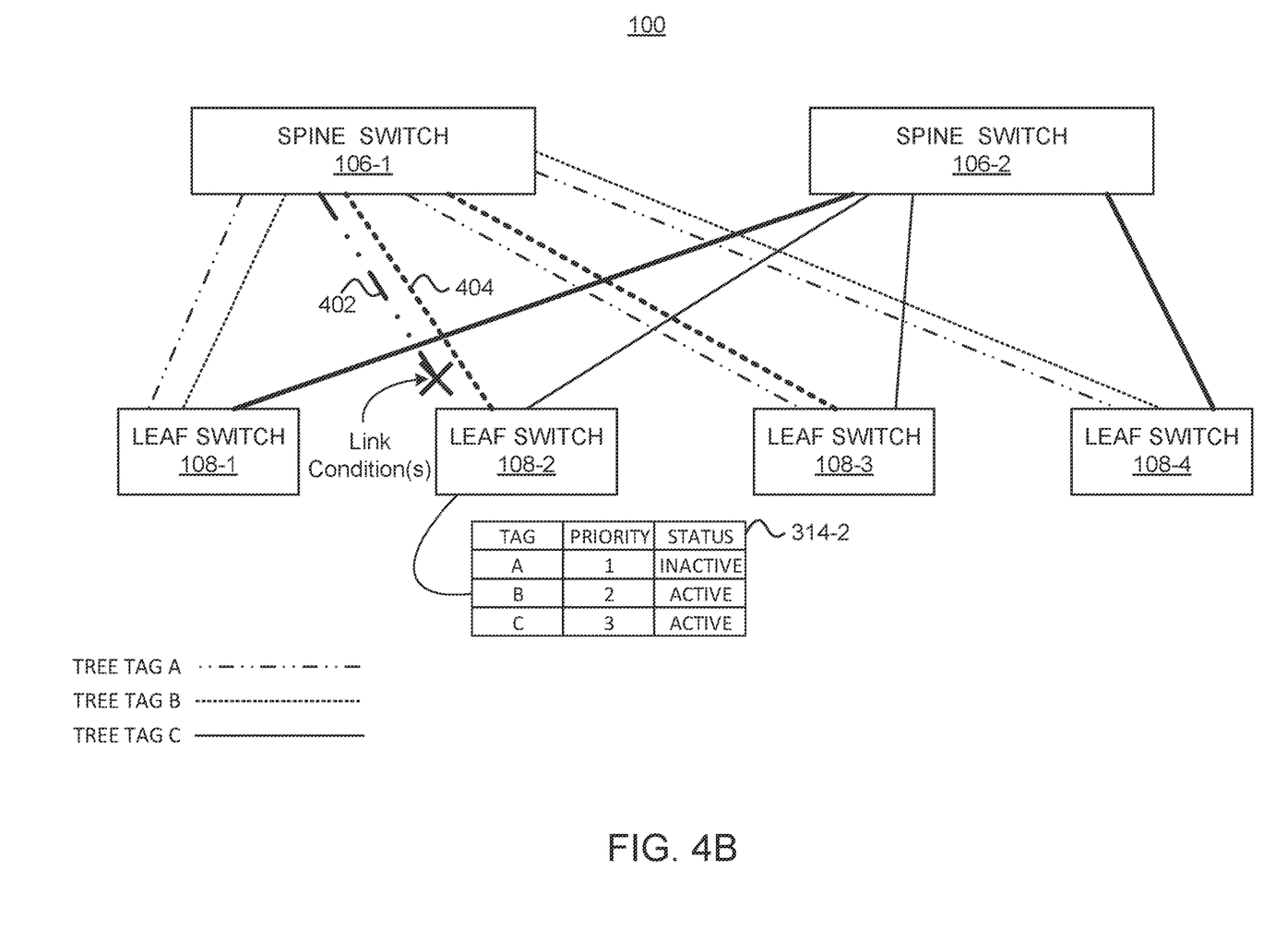

FIG. 4B illustrates an example scenario of a leaf switch (e.g., leaf switch 108-2) switching to a different multi-destination tree to forward multi-destination traffic after detecting a predetermined condition(s) associated with a link, according to one embodiment.

In the depicted scenario, leaf switch 108-2 is the ingress leaf switch (e.g., the entry point to the leaf-spine fabric). For example, the leaf switch 108-2 may use link 402 associated with multi-destination tree A to forward multi-destination traffic (e.g., one or more packets) received from a node 120 (e.g., a tenant). Subsequently, the leaf switch 108-2 detects a predetermined condition (e.g., link failure) associated with the link 402, and uses the multi-destination tree table 314-2 (at leaf switch 108-2) to select another multi-destination tree. Here, the leaf switch 108-2 selects link 404 associated with multi-destination tree B, which the multi-destination tree table 314-2 indicates as the "second" priority multi-destination tree. The leaf switch 108-2 also changes the status of the multi-destination tree A from "active" to "inactive" in the multi-destination tree table 314-2.

In this manner, embodiments allow each network device to independently achieve localized convergence, without dropping packets, in the event of link failures or other conditions. For example, while each network device in the fabric may include a tree selector 110, the ingress network device (initially receiving a given multi-destination message) may have the sole capability for switching to a different multi-destination tree for forwarding of the multi-destination message. As a result, there may be some situations in which the same multi-destination tree that is considered unusable by the ingress network device is considered usable by another (intermediate) network device. The control plane (e.g., controller 102) may be configured to ensure that, on steady state, the multi-destination tree (considered to be unusable by the ingress network device) is disabled from the entire leaf-spine fabric. Accordingly, by allowing each network device that may be the ingress network device for a given multi-destination message to independently switch the multi-destination tree used for forwarding of that message, embodiments can achieve localized convergence without dropping packets, while the control plane removes the disabled multi-destination tree from the entire fabric.

Figure 5:
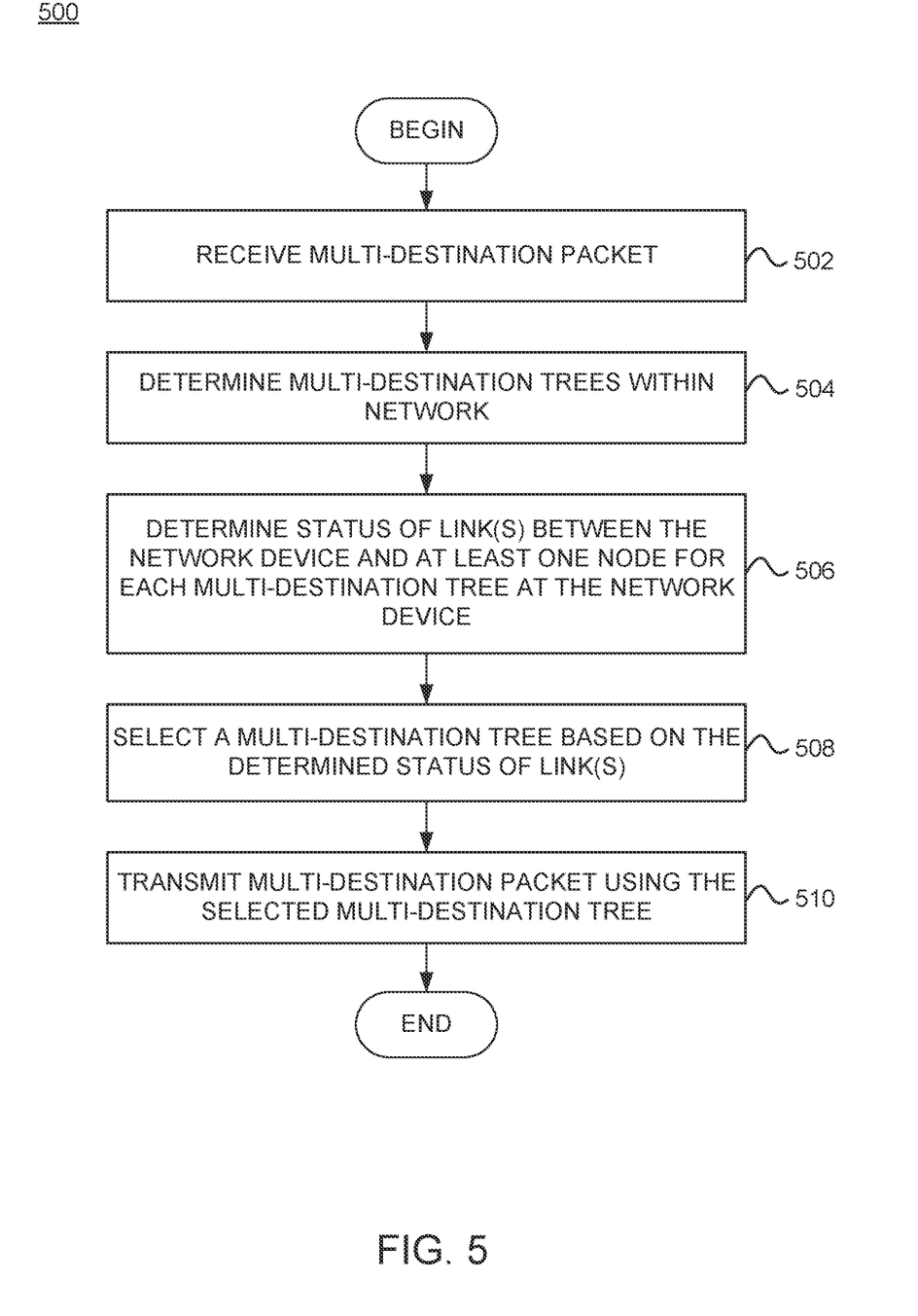
FIG. 5 is a flowchart for selecting a multi-destination tree to use for forwarding multi-destination traffic, according to one embodiment described herein.

FIG. 5 is a flowchart of a method 500 for selecting a multi-destination tree to use for forwarding multi-destination traffic, according to one embodiment. The method 500 may be performed by a network device (e.g., network device 300, leaf switch 108, spine switch 104, etc.).

Method 500 begins at block 502, where the network device receives a multi-destination packet. The multi-destination packet may include a broadcast packet, multicast packet, or unknown unicast packet. In one embodiment, the network device is the ingress network device of the switch fabric (e.g., leaf-spine fabric 130). In one example, the network device may be the ingress leaf switch receiving a multi-destination packet from a tenant (e.g., node 120). In another example, the network device may be the ingress spine switch receiving a multi-destination packet from another data center via a IPN network.

At block 504, the network device determines a set of multi-destination trees within the network that are available at the network device for forwarding the multi-destination packet. For example, the network device may determine the set of available multi-destination tress based on a multi-destination tree table (e.g., multi-destination tree table 314) received from the control plane (e.g., controller 102).

At block 506, the network device determines the status of link(s) between the network device and at least one node (e.g., another network device 300) for each multi-destination tree at the network device. In one embodiment, each multi-destination tree at the network device can have multiple links to another network device. By way of example, assuming a leaf switch is the network device, a multi-destination tree at the leaf switch can include at least one of: (1) an uplink towards the root spine switch, (2) an uplink towards a transit spine switch, and (3) an uplink towards a spine switch that has IPN connectivity.

At block 508, the network device selects a multi-destination tree based on the determined statuses of the link(s) between the network device and the at least one node. For example, in one embodiment, the network device may select a multi-destination tree that has a highest number of active links. In one embodiment, the network device may select a multi-destination tree that has a higher priority link (e.g., link to a spine switch with IPN connectivity) active. In one embodiment, the network device may select a multi-destination tree that satisfies a predetermined condition based on one or more metrics 316. For example, the network device may determine that a first link associated with a first multi-destination tree has a higher link utilization compared to a second link associated with a second multi-destination tree. In this example, the network device may select the second multi-destination tree to forward the multi-destination traffic. At block 510, the network device transmits the multi-destination packet using the selected multi-destination tree.

Figure 6:
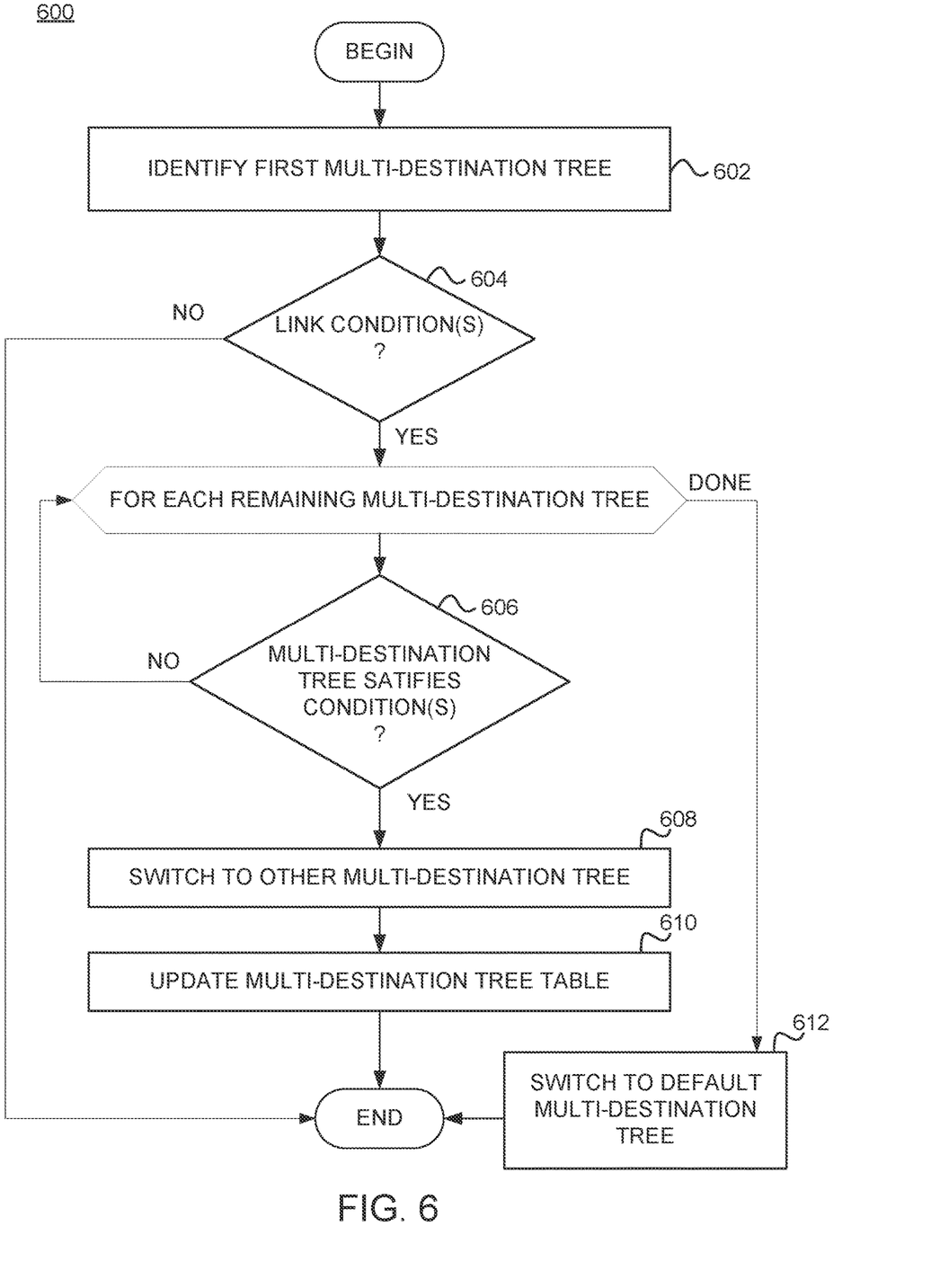
FIG. 6 is a flowchart for switching a multi-destination tree for forwarding multi-destination traffic, according to one embodiment described herein.

FIG. 6 is a flowchart of a method 600 for switching a multi-destination tree for forwarding multi-destination traffic, according to one embodiment. The method 600 may be performed by a network device (e.g., network device 300, leaf switch 108, spine switch 104, etc.).

Method 600 begins at block 602, where the network device identifies a first multi-destination tree available at the network device. In some embodiments, the first multi-destination tree may be a multi-destination tree being currently used by the network device to forward multi-destination traffic received at the network device. For example, the first multi-destination may be the highest priority multi-destination tree in the multi-destination tree table (e.g., multi-destination tree table 314) maintained at the network device. In some embodiments, the first multi-destination tree may be a multi-destination tree that is not currently being used by the network device to forward multi-destination traffic. For example, the first multi-destination tree may be a lower priority multi-destination tree in the multi-destination tree table maintained at the network device.

At 604, the network device determines if there is a link condition(s) associated with the first multi-destination tree. For example, the link condition(s) can include one or more of a link failure (e.g., LOS, a down link, etc.), quality of the link(s) below or above a threshold (e.g., signal strength of the link(s) is below a threshold, and a number of packet drops on the link(s) is above a threshold, etc.).

If a link condition has not occurred, the method ends. On the other hand, if a link condition has occurred, the network device looks for another multi-destination tree to use for forwarding multi-destination traffic. As shown, for each remaining multi-destination tree (e.g., at the network device), the network device determines if the multi-destination tree satisfies one or more predetermined conditions (block 606). In one embodiment, the one or more conditions may be based on a priority of the multi-destination tree. For example, the network device may select the next highest priority multi-destination tree in the multi-destination table at the network device. In one embodiment, the one or more conditions may be based on the metrics 316. For example, the network device may select the given multi-destination tree if speed of the link (associated with the multi-destination tree) is above a threshold, the link utilization (associated with the multi-destination tree) is below a threshold, etc.

If, at block 606, the network device determines that the multi-destination tree does not satisfy the condition(s), the network device evaluates the next multi-destination tree to determine if the multi-destination tree satisfies the condition(s). On the other hand, if the network device determines that the multi-destination tree does satisfies the condition(s), the network device switches to the multi-destination tree (block 608). At block 610, the network device updates the multi-destination table. For example, the network device may change a status of the first multi-destination tree in the multi-destination tree table to "inactive."

If the network device is unable to identify a multi-destination tree that satisfies the condition(s) (block 606), the network device switches to a default multi-destination tree (block 612). For example, in one embodiment, the default multi-destination tree may be the multi-destination tree that has an active uplink to a spine switch with IPN connectivity.

As noted, while embodiments use a spine-leaf fabric as an example network architecture in which network devices can switch multi-destination forwarding destinations in the event of link failures, the techniques may be extended to any network architecture in which access network devices communicate with each other via multiple core network devices providing redundancy in terms of the path a data flow may take between two access network devices. For example, the techniques may be extended to head-end replicated traffic from a data center interconnect (DCI) or inter-pod network (IPN). In these examples, the incoming traffic may be received by a network device as unicast traffic (e.g., without a multi-destination tree tag), and may be converted into multicast traffic for distribution in a given pod. In this process, the multi-destination tree tag can be regenerated subject to the link availability process described above (e.g., to account for down links between network devices).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
   detecting, by a first network device, that a link associated with a first multi-destination tree satisfies one or more criteria, wherein the first multi-destination tree is one of a plurality of multi-destination trees available at the first network device; and
   in response to detecting that the link satisfies the one or more criteria:
      evaluating, by the first network device, a plurality of links associated with each of the plurality of multi-destination trees using one or more metrics;
      selecting, by the first network device, a second multi-destination tree from the plurality of multi-destination trees, based on the evaluation; and
      modifying a status of the first multi-destination tree at the first network device to prevent at least a second network device from using the first multi-destination tree.

2. The computer-implemented method of claim 1, further comprising receiving, by the first network device, an indication of the plurality of multi-destination trees from a controller.

3. The computer-implemented method of claim 2, wherein the status of the first multi-destination tree is modified prior to a removal of the first multi-destination tree from the plurality of multi-destination trees by the controller.

4. The computer-implemented method of claim 1, wherein modifying the status of the first multi-destination tree at the first network device comprises changing the status from an active state to an inactive state.

5. The computer-implemented method of claim 1, wherein:
the first network device is in a first network; and
the one or more metrics comprises which of the plurality of links is connected to a second network.

6. The computer-implemented method of claim 1, wherein the one or more metrics comprises at least one of: (i) a speed of each of the plurality of links; (ii) utilization of each of the plurality of links; (iii) a number of errors on each of the plurality of links; (iv) queue occupancy of each of the plurality of links; (v) a traffic type of each of the plurality of links; (vi) a link medium of each of the plurality of links; and (vi) a traffic rate of each of the plurality of links.

7. The computer-implemented method of claim 1, wherein the one or more criteria comprises at least one of a failure of the link and a quality of the link below a threshold.

8. A network device, comprising:
a processor; and
a memory containing a program that, when executed by the processor, performs an operation comprising:
detecting that a link associated with a first multi-destination tree satisfies one or more criteria, wherein the first multi-destination tree is one of a plurality of multi-destination trees available at the network device; and
in response to detecting that the link satisfies the one or more criteria:
evaluating a plurality of links associated with each of the plurality of multi-destination trees using one or more metrics;
selecting a second multi-destination tree from the plurality of multi-destination trees, based on the evaluation; and
modifying a status of the first multi-destination tree at the network device to prevent at least another network device from using the first multi-destination tree.

9. The network device of claim 8, the operation further comprising receiving an indication of the plurality of multi-destination trees from a controller.

10. The network device of claim 9, wherein the status of the first multi-destination tree is modified prior to a removal of the first multi-destination tree from the plurality of multi-destination trees by the controller.

11. The network device of claim 8, wherein modifying the status of the first multi-destination tree at the network device comprises changing the status from an active state to an inactive state.

12. The network device of claim 8, wherein:
the network device is in a first network; and
the one or more metrics comprises which of the plurality of links is connected to a second network.

13. The network device of claim 8, wherein the one or more metrics comprises at least one of: (i) a speed of each of the plurality of links; (ii) utilization of each of the plurality of links; (iii) a number of errors on each of the plurality of links; (iv) queue occupancy of each of the plurality of links; (v) a traffic type of each of the plurality of links; (vi) a link medium of each of the plurality of links; and (vi) a traffic rate of each of the plurality of links.

14. The network device of claim 8, wherein the one or more criteria comprises at least one of a failure of the link and a quality of the link below a threshold.

15. A non-transitory computer-readable medium comprising computer program code that, when executed by one or more processors, performs an operation comprising:
detecting, by a first network device, that a link associated with a first multi-destination tree satisfies one or more criteria, wherein the first multi-destination tree is one of a plurality of multi-destination trees available at the first network device; and
in response to detecting that the link satisfies the one or more criteria:
evaluating, by the first network device, a plurality of links associated with each of the plurality of multi-destination trees using one or more metrics;
selecting, by the first network device, a second multi-destination tree from the plurality of multi-destination trees, based on the evaluation; and
modifying a status of the first multi-destination tree at the first network device to prevent at least a second network device from using the first multi-destination tree.

16. The non-transitory computer-readable medium of claim 15, the operation further comprising receiving, by the first network device, an indication of the plurality of multi-destination trees from a controller.

17. The non-transitory computer-readable medium of claim 16, wherein the status of the first multi-destination tree is modified prior to a removal of the first multi-destination tree from the plurality of multi-destination trees by the controller.

18. The non-transitory computer-readable medium of claim 15, wherein modifying the status of the first multi-destination tree at the first network device comprises changing the status from an active state to an inactive state.

19. The non-transitory computer-readable medium of claim 15, wherein:
the first network device is in a first network; and
the one or more metrics comprises which of the plurality of links is connected to a second network.

20. The non-transitory computer-readable medium of claim 15, wherein the one or more metrics comprises at least one of: (i) a speed of each of the plurality of links; (ii) utilization of each of the plurality of links; (iii) a number of errors on each of the plurality of links; (iv) queue occupancy of each of the plurality of links; (v) a traffic type of each of the plurality of links; (vi) a link medium of each of the plurality of links; and (vi) a traffic rate of each of the plurality of links.

* * * * *

UNITED STATES PATENT AND TRADEMARK OFFICE
CERTIFICATE OF CORRECTION

PATENT NO. : 11,424,978 B2
APPLICATION NO. : 17/102062
DATED : August 23, 2022
INVENTOR(S) : Putu H. Subagio et al.

It is certified that error appears in the above-identified patent and that said Letters Patent is hereby corrected as shown below:

In the Specification

In Column 3, Line 12, delete "tree" and insert -- tree. --.

In the Claims

In Column 13, Line 13, in Claim 6, delete "(vi)" and insert -- (vii) --.

In Column 14, Line 4, in Claim 13, delete "(vi)" and insert -- (vii) --.

In Column 14, Line 54, in Claim 20, delete "(vi)" and insert -- (vii) --.

Signed and Sealed this
Tenth Day of January, 2023

Katherine Kelly Vidal
*Director of the United States Patent and Trademark Office*